(12) United States Patent
Pecen et al.

(10) Patent No.: US 7,940,724 B2
(45) Date of Patent: May 10, 2011

(54) NETWORK ASSISTED CELL RESELECTION IN WIRELESS COMMUNICATIONS SYSTEMS AND METHODS

(75) Inventors: Mark Pecen, Palatine, IL (US); Niels Peter Skov Andersen, Roskilde (DK); Stephen Howell, Gloucester (GB); Arnold Sheynman, Northbrook, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 0 days.

(21) Appl. No.: 10/358,864

(22) Filed: Feb. 5, 2003

(65) Prior Publication Data
US 2004/0095905 A1 May 20, 2004

Related U.S. Application Data

(60) Provisional application No. 60/427,190, filed on Nov. 18, 2002.

(51) Int. Cl.
*H04W 4/00* (2009.01)
(52) U.S. Cl. .......................... 370/331; 370/332; 455/438
(58) Field of Classification Search .................. 370/229, 370/230, 235, 310, 328, 329, 331, 332; 455/403, 455/422.1, 436–444
See application file for complete search history.

(56) References Cited

U.S. PATENT DOCUMENTS

| | | | |
|---|---|---|---|
| 5,524,009 A | 6/1996 | Tuutijarvi et al. | |
| 5,903,841 A * | 5/1999 | Kondo | 455/436 |
| 5,956,644 A * | 9/1999 | Miller et al. | 455/453 |
| 6,125,278 A * | 9/2000 | Wieczorek et al. | 455/437 |
| 6,263,203 B1 * | 7/2001 | Jahn | 455/436 |
| 6,295,450 B1 * | 9/2001 | Lyer et al. | 455/436 |
| 6,434,390 B2 | 8/2002 | Rahman | |
| 6,594,238 B1 * | 7/2003 | Wallentin et al. | 370/252 |
| 6,970,707 B2 * | 11/2005 | Igarashi et al. | 455/437 |
| 2001/0041569 A1 * | 11/2001 | Rahman | 455/436 |
| 2002/0032032 A1 * | 3/2002 | Haumont et al. | 455/436 |
| 2002/0122396 A1 | 9/2002 | Terasawa | |
| 2002/0168980 A1 * | 11/2002 | Gwon et al. | 455/437 |
| 2004/0259564 A1 * | 12/2004 | Farley et al. | 455/453 |

OTHER PUBLICATIONS

U.S. Appl. No. 60/427,190, filed Nov. 18, 2002, Pecen, Mark et al.
Stephen Howell, Mark Pecen, Niels Andersen, Arnold Sheynman, "Network controlled/assisted cell reselection mode in GSM/UMTS environment", Motorola, Inc., Oct. 30, 2002, 6 pages.
ETSI EN 301 113 V6.3.1 (Nov. 2000) European Standard (Telecommunications series), Digital cellular telecommunications system (Phase 2+); General Packet Radio Service (GPRS); Service description; Stage 1 (GSM 02.60 version 6.3.1 Release 1997) Global System for Mobile Communications, 5 pages.
3GPP TS 03.22 V6.3.0 (Apr. 2001) Technical Specification, 3rd Generation Partnership Project; Technical Specification Group GERAN; Functions related to Mobile Station (MS) in idle mode and group receive mode (Release 1997), Global System for Mobile Communications, 5 pages.

(Continued)

*Primary Examiner* — Jason E Mattis
(74) *Attorney, Agent, or Firm* — Roland K. Bowler, II

(57) ABSTRACT

A method in a mobile wireless communications network including sending (210) a reselection communication from a mobile station to the network, and receiving (220), from the network in response to the reselection communication, cell reselection assistance information, for example, a new cell assignment.

9 Claims, 5 Drawing Sheets

OTHER PUBLICATIONS

3GPP TS 03.60 V6.11.0 (Sep. 2002), Technical Specification, "3rd Generation Partnership Project; Technical Specification Group Services and System Aspects; General Packet Radio Service (GPRS); Service description; Stage 2" (Release 1997), Global System for Mobile Communications, 13 pages.

3GPP TS 05.01 V8.7.0 (Apr. 2003), Technical Specification, 3rd Generation Partnership Project; Technical Specification Group GSM/EDGE Radio Access Network; Physical layer on the radio path; General description (Release 1999), 28 pages.

3GPP TS 05.08 V8.16.0 (Apr. 2003), Technical Specification, "3rd Generation Partnership Project; Technical Specification Group GSM/EDGE Radio Access Network; Radio subsystem link control" (Release 1999), Global System for Mobile Communications, 25 pages.

3GPP TS 22.060 V3.5.0 (Oct. 2000) Technical Specification, "3rd Generation Partnership Project; Technical Specification Group Services and System Aspects; General Packet Radio Service (GPRS); Service description, Stage 1" (Release 1999), 5 pages.

3GPP TS 23.060 V3.14.0 (Dec. 2002) Technical Specification, "3rd Generation Partnership Project; Technical Specification Group Services and System Aspects; General Packet Radio Service (GPRS); Service description; Stage 2" (Release 1999), Global System for Mobile Communications, 19 pages.

3GPP TS 24.008 V3.15.0 (Mar. 2003) Technical Specification, 3rd Generation Partnership Project; Technical Specification Group Core Network; Mobile radio interface layer 3 specification; Core Network Protocols—Stage 3 (Release 1999), Global System for Mobile Communications, 68 pages.

3GPP TS 25.331 V3.14.0 (Mar. 2003) Technical Specification, "3rd Generation Partnership Project; Technical Specification Group Radio Access Network; Radio Resource Control (RRC) protocol specification" (Release 1999), 52 pages.

3GPP TS 43.064 V4.4.0 (Apr. 2003) Technical Specification, "3rd Generation Partnership Project; Technical Specification Group GERAN; Digital cellular telecommunications system (Phase 2+); General Packet Radio Service (GPRS); Overall description of the GPRS radio interface; Stage 2" (Release 4) Global System for Mobile Communications, 7 pages.

3GPP TS 44.018 V4.14.0 (Apr. 2003) Technical Specification, "3rd Generation Partnership Project; Technical Specification Group GSM/EDGE Radio Access Network; Mobile radio interface layer 3 specification, Radio Resource Control (RRC) protocol" (Release 4), Global System for Mobile Communications, 21 pages.

3GPP TS 44.060 V4.11.0 (Apr. 2003) Technical Specification, "3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol" (Release 4), Global System for Mobile Communications, 19 pages.

3GPP TS 45.008 V4.10.0 (Apr. 2003) Technical Specification, "3rd Generation Partnership Project; Technical Specification Group GSM/EDGE Radio Access Network; Radio subsystem link control" (Release 4), Global System for Mobile Communications, 24 pages.

Saffell, Christine, "Supplementary European Search Report", completed Apr. 1, 2010, mailed Apr. 16, 2010.

3GPP TSG GERAN WG2 #62bis, Oct. 22-26, 2001, Aix-en-Provence, France; Tdoc G2-010430, Revised Tdoc G2-010321; 3G TR xx.yyy V 0.4.0 (Oct. 2001) 3rd Generation Partnership Oroject; Technical Specification Group GSM EDGE Radio Access Network; External Network Assisted Cell Chane; (Release 5); Sections 4.3, 4.4.1.

3GPP TSG GERAN Meeting No. 3, Boston, MA, USA; Jan. 15-19, 2001; Tdoc GP-010361, Revised Tdoc GP-010292; "Network Assisted Cell Change; Concept Document" V 0.0.6; 3GPP TSG GERAN Ad hoc#3; Sections 3.1, 3.3, 4.3, 4.4, 4.4.4.

ETSI TS 145 008 V5.8.0 (Sep. 2002); Digital Cellular Telecommunications System (Phase 2+); Radio Subsystem Link Control (3GPP TS 45.008 version 5.8.0 Release 5) sections 10.1.4, 10.1.4.2.

\* cited by examiner

NETWORK ASSISTED CELL RESELECTION IN WIRELESS COMMUNICATIONS SYSTEMS AND METHODS

CROSS-REFERENCE TO RELATED APPLICATIONS

The present application is related to commonly assigned and co-pending U.S. provisional Application No. 60/427,190 entitled "Method And Apparatus for Predicting a Cell Change" filed on 18 Nov. 2002, the disclosure of which is incorporated herein by reference and from which benefits are claimed under 35 U.S.C. 119.

FIELD OF THE DISCLOSURE

The present disclosure relates generally to wireless communications, and more particularly to cell re-selection in wireless communications networks, for example in Global System for Mobile Communication (GSM) and/or Universal Mobile Telecommunications System (UMTS) networks during packet data interchanges, and methods therefor.

BACKGROUND

The General Packet Radio Service (GPRS) and its superset, Enhanced Data for Global Evolution (EDGE) for GSM, have enabled data interchange among mobile wireless subscriber device users. GPRS/EDGE permit efficient use of radio and network resources when data transmission characteristics are packet based, intermittent and non-periodic, possibly frequent with small transfers of data, for example, less than 500 octets, and possibly infrequent, with large data transfers, for example, transfers of more than several hundred Kbytes.

Public Land Mobile Network (PLMN) operators originally considered GPRS/EDGE as means for generating additional revenues based on excess capacity, for example, during non-peak usage periods. User applications were originally envisioned to include Internet browsing capabilities, electronic mail, file transfers and other applications for which best efforts data transfers were appropriate. The market for GPRS/EDGE based services however has grown dramatically and now constitutes a significant amount of network traffic during peak usage periods.

The concepts of Network Controlled Cell Selection (NCCS) and Network Assisted Cell Selection (NACS) were introduced into the GSM protocol standards to increase the efficiency of the 3rd Generation enhancement to the GPRS, thus addressing the negative impact that cell reselection has on user data throughput.

In order to maintain system simplicity, there exists no real-time handover procedure specified for best effort packet data transfers over GPRS/EDGE. Cell change is achieved in Revision 5 and prior specifications of GPRS/EDGE by simply allowing the mobile user equipment (UE) to reselect cells as it does in idle mode. This procedure causes the mobile UE to abort its packet transfer on one cell and completely re-establish the ongoing transfer on another cell.

This simple cell change mechanism is fairly effective if the new cell to which the mobile UE reselects supports GPRS/EDGE data services and has sufficient capacity to support additional packet data traffic. What frequently occurs in system operation, however, is that after the mobile UE aborts operation on the old cell and attempts to reselect to a new cell, the packet data transfer fails, often because the new cell does not have sufficient capacity to support additional packet data traffic. The mobile UE must subsequently wait and try to re-establish the data transfer. Meanwhile, the mobile UE may reselect to another cell, which may accommodate its request for a packet data transfer.

The mobile station in GPRS standby and Ready states performs cell selection autonomously by monitoring the signal strength of adjacent cells specified in a Broadcast Allocation (BA) list, which is broadcast on the Packet Broadcast Control Channel (PBCCH) or on the Broadcast Control Channel (BCCH) in the absence of the PBCCH. During packet transfer mode operation, the UE monitors the serving cell carrier and all neighbor cell carriers indicated on the BA list. A received signal strength measurement indicator (RSSI) is made in every Time Division Multiple Access (TMDA) frame on the BCCH carriers, one after another.

The reselection decision process uses the received signal level average (RLA_P), which is calculated as a running average of samples collected over a period of 5 seconds and is maintained for each BCCH carrier. The samples allocated to each carrier are distributed as uniformly as possible over the evaluation period. At least 5 received signal level measurement samples are required for a valid RLA_P.

Several criteria are used for GPRS cell reselection. A path loss criterion parameter C1 represents a minimum signal level for cell reselection for GPRS. C1 is based on the corresponding RLA_P value and represents a link budget computation based on path loss and assumptions about the RSSI of the serving cell. The mobile station reselects when C1 is 0 dBM and when other requirements are met. A cell ranking criterion parameter C32 is for selecting cells among those with the same priority. For the serving cell, C32 is equal to C1. For each neighbor cell, C32 is equal to C1 modified with cell broadcast parameters. The signal level threshold criterion parameter C31 for hierarchical cell structures (HCS) is used to assess prioritized hierarchical GPRS.

The mobile station updates RLA_P and determines C1, C31 and C32 for the serving cell and the non-serving (neighbor) cells for each new sample collected or every second, whichever is greater. Cell reselection is performed if the path loss criterion parameter C1 for the serving cell falls below zero, and if a suitable non-serving cell (see 3GPP TS03.22) is determined to be better than the serving cell. Generally, the best cell is the one having the greatest value of C32. When evaluating the best cell, hysteresis parameter values are subtracted from the C32 value for the neighbor cells. The hysteresis parameter values are broadcast on the serving cell PBCCH. For cell reselection occurring within 15 seconds of a previous reselection, the hysteresis value for RSSI is equal to 5 dB. If no suitable cell is located within 10 seconds, a cell selection algorithm is performed.

During packet data interchange, stationary or semi-stationary a mobile UE in suburban and/or urban environments may reselect substantially continuously, usually among 3 to 5 cells every 15 to 45 seconds, forcing the need for re-establishment of the packet data transfer every time reselection occurs. The high frequency of cell reselection however may adversely impact user data throughput.

The various aspects, features and advantages of the disclosure will become more fully apparent to those having ordinary skill in the art upon careful consideration of the following Detailed Description thereof with the accompanying drawings described below.

DETAILED DESCRIPTION

Figure 1:
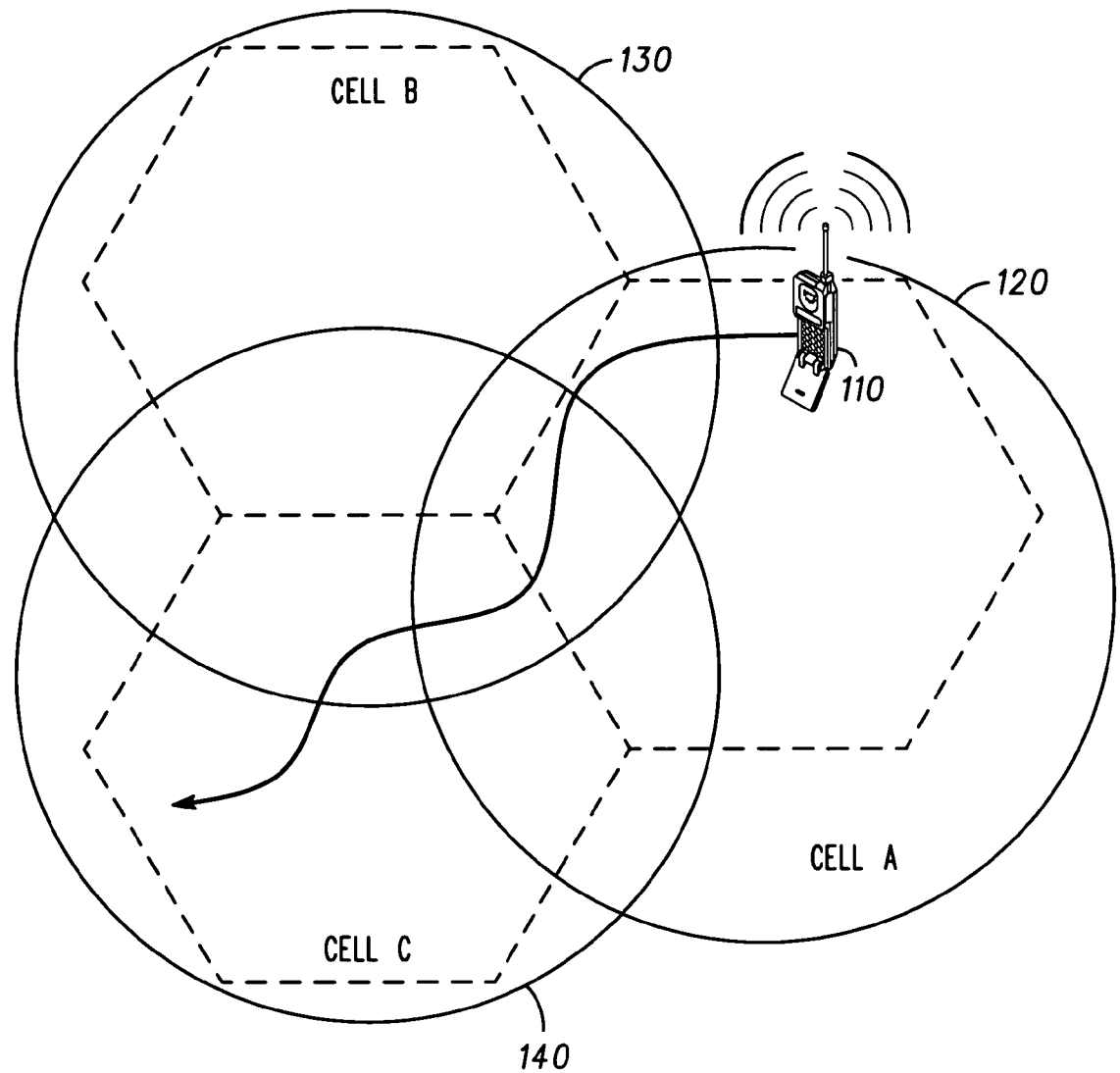
FIG. 1 is an exemplary cellular communications network.

In FIG. 1, under autonomous cell reselection, for example, during packet data interchange, a mobile station 110, located initially in Cell A 120 and moving toward Cell B 130, attempts to reselect to Cell B based on a known autonomous reselection protocol, for example, when the path loss criterion C1 for Cell A falls below 0 dBm. If Cell B is incapable of supporting the packet data interchange, the mobile station must reselect to another cell, for example, to Cell C, if another cell is available or the mobile station attempts to reselect to Cell B at a later time.

Figure 2:
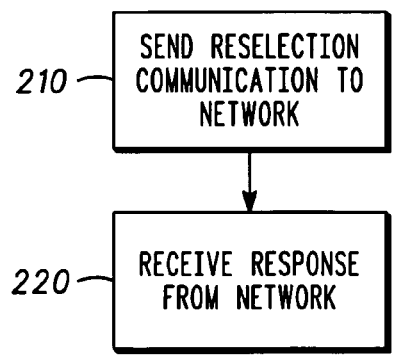
FIG. 2 is an exemplary process flow diagram.

In the process diagram 200 of FIG. 2, according to one mode of operation, at block 210 the mobile station sends a reselection communication to the network before reselecting. The reselection communication is an indication that reselection is likely to occur at some future time, or that reselection is imminent.

In one embodiment, the mobile station architecture includes a reselection predictor that predicts when reselection is likely to occur. In the exemplary implementation of FIG. 3, the reselection predictor 302 receives C1 parameter values, which are calculated based on RSSI measurements, at an input 304 from a measurement module 310. The C1 parameter value is exemplified herein, but other criteria may be used alternatively.

The reselection predictor includes an output 306 for indicating when reselection is likely to occur. In one embodiment, for example, the mobile station sets a "reselection" bit in an uplink measurement report sent to the network to notify the network of the impending reselection based upon the output of the reselection predictor. The exemplary reselection predictor also includes a second output 308 for indicating to a virtual bearer (VB), for example, a virtual streaming bearer (VSB), or some other module on the mobile station that reselection is imminent. The outputs 306 and 308 may be provided in the alternative, or both outputs may be provided.

Figure 3:
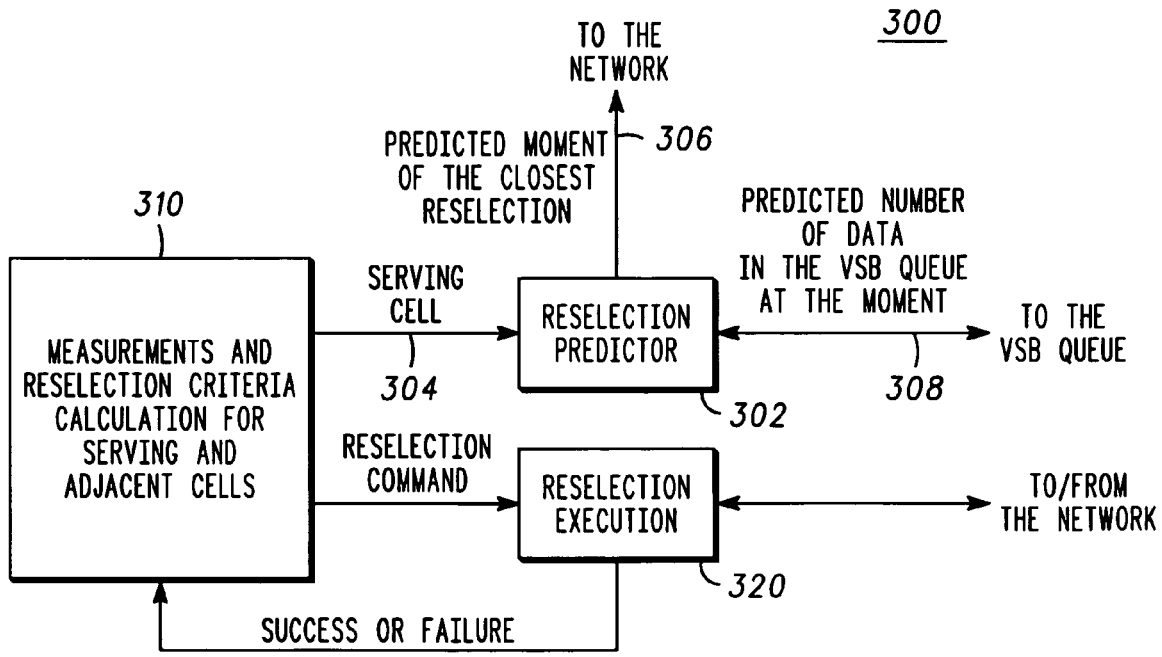
FIG. 3 illustrates mobile station architecture.

In FIG. 3, reselection is performed by a reselection execution module 320 on the mobile station in response to a reselection command when reselection is required. The reselection command may result from a determination made at the network or at the mobile station, as discussed more fully below.

Figure 4:
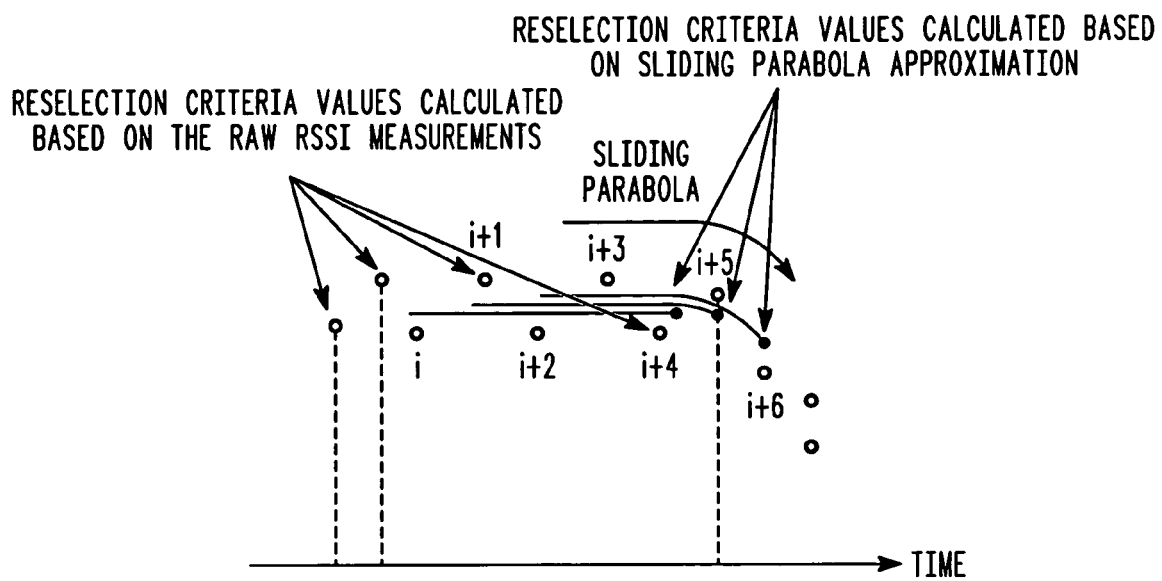
FIG. 4 represents reselection measurements for a predictor.

In one embodiment, generally, reselection is predicted based upon reselection criteria, RC, computed from a set of several curves fit to approximate corresponding sets of C1 parameter values, and based upon coefficients of the curve. In the exemplary embodiment, the parabolic curves approximate a set of several $y_i$=C1 parameter values, which are based on corresponding RSSI measurements acquired at time $t_i$. Curve coefficients $a_0$, $a_1$ and $a_2$ are computed as a function of $y_i$ and $t_i$ using a minimum least squares method based upon a corresponding set of C1 parameter values. In FIG. 4, each parabolic curve is computed to approximate five (5) C1 parameter values. For each new C1 parameter value, a new set of parabolic curve coefficients is generated to approximate the 5 most recent C1 parameter values. In FIG. 4, the first parabolic curve is based upon C1 values at times $t_i$ through $t_{i+4}$, the next parabolic curve is based upon C1 values at times $t_{i+1}$ through $t_{i+5}$, and the next parabolic curve is based upon C1 values at times $t_{i+2}$ through $t_{i+6}$, etc. For each parabolic curve, a reselection criterion, RC, is computed at the time corresponding to the last C1 value using the relation $RC = a_0 + a_1 t_n + a_2 t_n^2$. Several reselection criteria, RC, points are illustrated in FIG. 4.

An exemplary algorithm for the reselection predictor starts the n-points sliding parabola calculation by finding required initial sums based on the first $y_j$, where $y_j$ is the C1 parameter value from the GSM 3GPP protocol standards discussed above, reselection criteria values at the corresponding moments $t_j$:

$$S_{t0} = \sum_{j=1}^{n} t_j; \quad S_{tt0} = \sum_{j=1}^{n} t_j t_j; \quad S_{ttt0} = \sum_{j=1}^{n} t_j t_j t_j; \quad S_{tttt0} = \sum_{j=1}^{n} t_j t_j t_j t_j;$$

$$S_{y0} = \sum_{j=1}^{n} y_j; \quad S_{ty0} = \sum_{j=1}^{n} t_j y_j; \quad S_{tty0} = \sum_{j=1}^{n} t_j t_j y_j.$$

The reselection criteria calculation is based on raw RSSI measurements separated in time by an interval $\Delta T$.

The following calculations are performed starting with initialization of i=1.

BEGIN

RSSIi=get_RSSI_measurements(ti);

yi=calculate_reselection_criteria(RSSIi);

//Current sums based on the previous ones $B = S_{t(i)} = S_{t(i-1)} - t_{i-1} + t_i;$ $C = S_{tt(i)} = S_{tt(i-1)} - t_{i-1} t_{i-1} + t_i t_i;$ $F = S_{ttt(i)} = S_{ttt(i-1)} - t_{i-1} t_{i-1} t_{i-1} + t_i t_i t_i;$ $M = S_{tttt(i)} = S_{tttt(i-1)} - t_{i-1} t_{i-1} t_{i-1} t_{i-1} + t_i t_i t_i t_i;$ $P = S_{y(i)} = S_{y(i-1)} - y_{i-1} + y_i;$ $R = S_{ty(i)} = S_{ty(i-1)} - t_{i-1} y_{i-1} + t_i y_i;$ $S = S_{tty(i)} = S_{tty(i-1)} - t_{i-1} t_{i-1} y_{i-1} + t_i t_i y_i;$ //Auxiliary parameters $D = S_{t(i)};$ $E = S_{tt(i)};$ $K = S_{tt(i)};$ $L = S_{ttt(i)};$ $Q = D/n;$ $E = E - QB;$ $F = F - QC;$ $R = R - QP;$ $Q = K/n;$ $L = L - QB;$ $M = M - QC;$ $S = S - QP;$ $Q = L/E;$ //Coefficients of the sliding parabola ending at the moment $t_n$ $a_2=(S-RQ)/(M-FQ);$ $a_1=(R-Fa_2)/E;$ $a_0=(P-Ba_1-Ca_2)/n;$ //Reselection criteria at the moment $t_n$ calculated based on
//approximation $RC(t_n)=a_0+a_1 t_n+a_2 t_n^2$ $i=i+1;$

END

Figure 5:
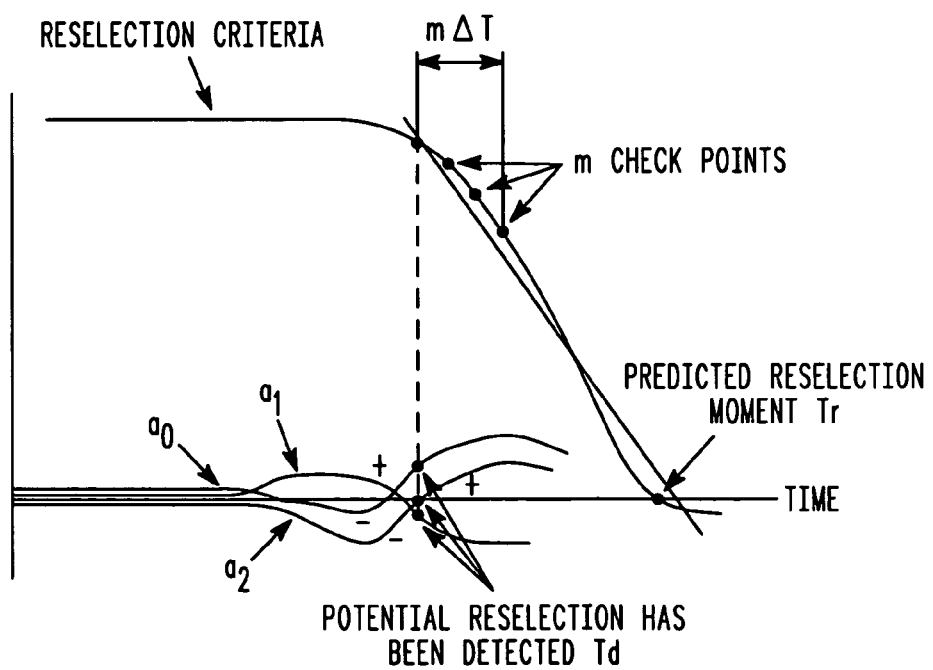
FIG. 5 represents reselection criteria for a predictor.

FIG. 5 is a graphical illustration of the reselection criteria RC, and coefficients $a_0$, $a_1$ and $a_2$. Reselection is determined to be imminent when RC values evaluated at endpoints of several sequential curves are descending, and when the coefficients $a_0$, $a_1$ and $a_2$ for at least some of the several sequential curves satisfy conditions indicative of an impending reselection as discussed more fully below. In one embodiment, when reselection is imminent, the estimated time at which cell reselection occurs is determined by the relation $T_r = -a_0(T_d)/a_1(T_d)$. The point in time $T_d$ is when a potential reselection has been detected and $T_c = T_d + m\Delta T$ is a current moment of time.

In one embodiment, when m=3, reselection is predicted as follows:

IF $0<RC(T_c)<RC(T_c-\Delta T)<RC(T_c-2\Delta T)<RC(T_d=T_c-3\Delta T)$

AND $a_0(T_d)>0$ AND $a_1(T_d)<0$ AND sign$[a_2(T_d-\Delta T)]<0$ AND sign$[a_2(T_d+\Delta T)]>0$

AND sign$[a_0(T_c)]>0$ AND sign$[a_1(T_c)]<0$

THEN,
the cell reselection predicted time is $T_r=-a_0(T_d)/a_1(T_d).$

The reselection predictor may run continuously during a connection. Each time the conditions for predicting a reselection are satisfied, $T_r$ will be updated. When reselection conditions are no longer met, cell reselection will not be predicted. These and other aspects of reselection prediction are discussed more fully in U.S. provisional patent application No. 60/427,190 entitled "Method And Apparatus for Predicting a Cell Change" filed on 18 Nov. 2002.

In other embodiments or implementations of the invention, cell reselection may be predicted, determined or assessed by other means or schemes. Additionally, in some applications it may not be necessary to predict precisely when an imminent reselection will occur, so long as the mobile station informs the network with sufficient time to intervene or influences what would otherwise be an autonomous reselection process performed by the mobile station.

Once the network has received the indication from the mobile station that cell reselection is imminent, the network may take several different actions. If the network sees no benefit in commanding the mobile station to a particular cell, e.g., if all cells in the mobile station's BA list are equally likely to provide the mobile station with service or if it does not have sufficient knowledge of the cell that is to be reselected, then the network may choose to allow the mobile station to carry out the cell reselection autonomously.

In some implementations, the network does not send a communication to the mobile station in response to the reselection received therefrom. In practice, the mobile station may be programmed to reselect autonomously if it does not receive a reply within some specified time interval after sending the reselection communication to the network. This scheme reduces the network-signaling load. Alternatively, however, the network may authorize autonomous reselection by sending an affirmative communication to the mobile station.

In FIG. 2, at block 220, in some embodiments the mobile station receives a communication with reselection instructions from the network in response to the reselection communication sent by the mobile station. If the network is aware of capacity issues in one or more of the cells that are reselection candidates, the network may direct the mobile station to a particular cell, for example, by sending the mobile station the Cell Index of the cell to which the network wants the mobile station to reselect. If the network is aware that the mobile station is in or near a Routing Area (RA) border and that one or more of the cells that may be reselected are in different Routing Areas to the one currently serving the mobile station, the network may direct the mobile station to a particular cell within the current or other desired RA.

Allowing the network to control or assist reselection generally reduces the amount of signaling load within a network and reduces the number of breaks in data transmission during packet data interchange, including reduction in the number of SGSN re-allocations.

If the network is aware that the mobile station is potentially moving out of coverage of the data service, for example, one or more of the cells that may be reselected do not support GPRS, the network may provide a communication indicating that the data service must be terminated, thereby providing some advance notice so that the mobile station may terminate the data interchange gracefully. The advanced termination notice may also be useful to applications sending or receiving data during the packet data interchange. In other embodiments, the network does not provide any communication to the mobile station when the network is unable to direct the mobile station to reselect a cell that can provide continued data service.

Figure 6:
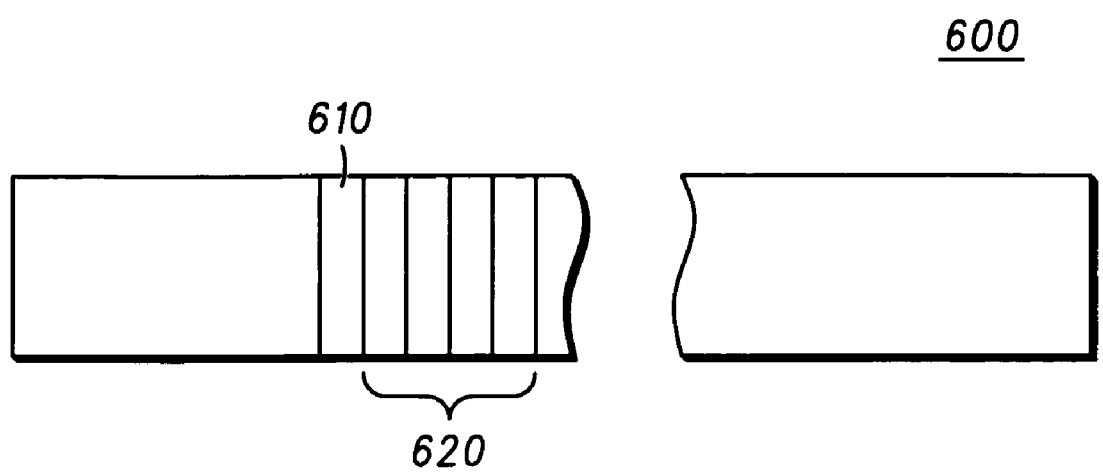
FIG. 6 is an exemplary message for communication reselection information from a mobile station to a network.

FIG. 6 is an exemplary message 600 for communicating reselection information from the mobile station to the network. In the exemplary embodiment discussed above, the message is a measurement message, although in other embodiments the information may be embedded in any other wireless communications uplink message. In one embodiment, the exemplary message includes a reselection imminent bit 610, which may be set or not set to indicate that reselection is imminent. In other embodiments, the message includes, in addition to or in place of the reselection bit, information regarding when reselection will occur, for example, a time period encoded by a grouping of several bits 620, the presence of which may indicate that reselection is imminent. In other embodiments, the mobile station indicates to the network to which cell the mobile station intends to reselect. The message may also include bits for communicating this information.

In some implementations it is desirable to disable certain autonomous reselection mode features on the mobile station. For example, it may be desirable to disable a cell ranking parameter on the mobile station. Where the exemplary reselection predictor is implemented in GSM mobile stations, it may be desirable to disable the C32 reselection criterion.

Figure 7:
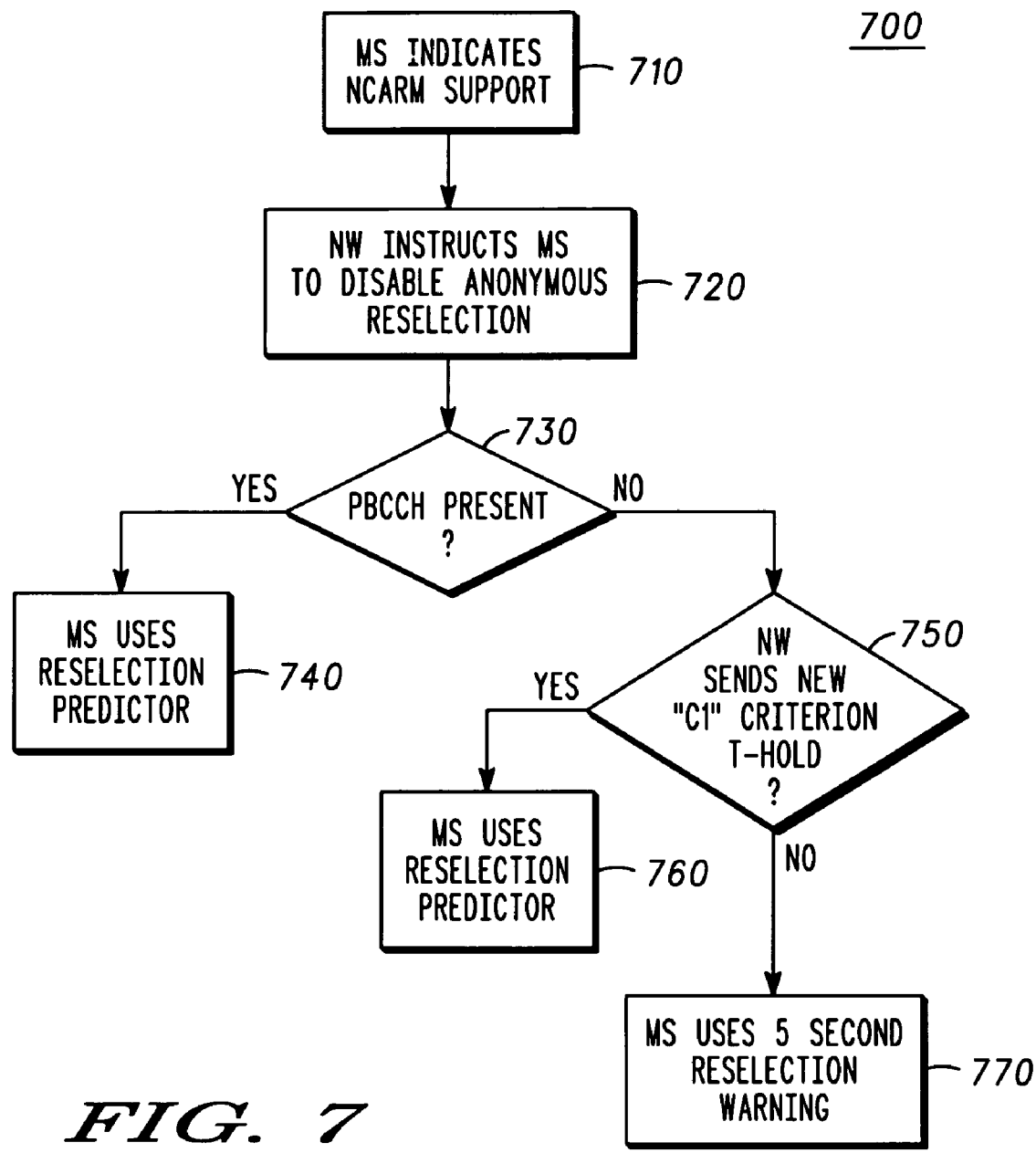
FIG. 7 is another exemplary process flow diagram.

In the exemplary process flow diagram of FIG. 7, at block 710 the mobile station indicates, to the network, whether it supports controlled/assisted reselection (NCARM) mode operation, for example, whether the mobile station is capable of performing reselection prediction. This information may be communicated to the network from the mobile station, for example, on the first attach to a PLMN, or during each Routing Area Update (RAU), or at the start of each data session, i.e., on establishment of a Packet Data Protocol (PDP) context. If the indication from the mobile station is provided at an RAU, then it will be provided each time the mobile station performs an RAU. If the indication from the mobile station is provided at the start of a data session then the mobile station will provide the indication each time a PDP context is established and also each time an existing PDP Context is re-established. The network will maintain the information for the duration of the mobile station's connection to the network.

In FIG. 7, at block 720, the mobile station receives a reselection control communication from the network in response to sending the network controlled/assisted reselection mode support communication to the network. Generally, the mobile station will perform reselection based on the reselection control communication from the network.

In one embodiment, the network sends a communication to the mobile station disabling reselection in the mobile station based on adjacent cell signal strength. In GSM communications systems, for example, the network sends a hysteresis parameter to the mobile station disabling use of the C32 criterion parameter for reselection. The purpose of disabling the C32 criterion parameter is to strictly confine cell reselection to RF conditions on the serving cell, which may be predicted by the reselection predictor module discussed above or by some alternative reselection predictor that relies upon the current cell conditions to predict reselection.

In FIG. 7, at block 730, if a PBCCH is present in the serving cell, then the mobile station will use a reselection predictor for determining when a cell change is due to occur, as indicated at block 740. In the absence of the PBCCH in the serving cell, then the network provides the mobile station with a C1 criterion threshold that is different than 0 dB, which is the default C1 value. If the network provides an alternative threshold, at block 750, then the mobile station uses the reselection predictor for determining when reselection will occur, as indicated at block 760. Otherwise, at block 770, if PBCCH is not present and the network does not send a new C1 threshold, the mobile station uses a default 5 second warning for determining when reselection will occur after the 0 dBm reselection threshold condition is satisfied.

While the present disclosure and what are presently considered to be the best modes thereof have been described in a manner that establishes possession by the inventors and that enables those of ordinary skill in the art to make and use the same, it will be understood and appreciated that there are many equivalents to the exemplary embodiments disclosed herein and that myriad modifications and variations may be made thereto without departing from the scope and spirit of the inventions, which are to be limited not by the exemplary embodiments but by the appended claims.

What is claimed is:

1. A method in a mobile wireless communication device, the method comprising:
    sending a network controlled/assisted reselection mode support communication to a network, the network controlled/assisted reselection mode support communication indicating whether the mobile wireless communication device is capable of performing reselection prediction;
    receiving a reselection control communication from the network in response to sending the network controlled/assisted reselection mode support communication to the network;
    disabling a reselection parameter on the mobile wireless communication device in response to receiving the reselection control communication,
    wherein the reselection parameter is a cell ranking parameter.

2. The method of claim 1, disabling reselection in the mobile wireless communication device based on adjacent cell information in response to the reselection control communication from the network.

3. The method of claim 1, reselecting using a reselection predictor on the mobile wireless communication device when a packet broadcast control channel is present in a serving cell.

4. The method of claim 1 further comprising reselecting based on the reselection control communication from the network.

5. A method in a mobile wireless communication network, the method comprising:
    receiving a network reselection mode support communication from a mobile station;
    sending a reselection control communication to the mobile station in response to receiving the network reselection mode support communication from the mobile station,
    the reselection control communication instructing the mobile station to disable reselection based on adjacent cell information;
    sending a reselection control communication includes instructing the mobile station to disable a cell ranking parameter on the mobile station in response to receiving the reselection control communication.

6. A method in a mobile wireless communication device, the method comprising:
    sending a network controlled/assisted reselection mode support communication to a network, the network controlled/assisted reselection mode support communication indicating whether the mobile wireless communication device is capable of performing reselection prediction;
    receiving a reselection control communication from the network in response to sending the network controlled/assisted reselection mode support communication to the network;
    receiving a new reselection threshold, reselecting using a reselection predictor on the mobile wireless communication device after receiving the new reselection threshold in the absence of a packet broadcast control channel in a serving cell.

7. A method in a mobile wireless communication device, the method comprising:
    sending a network controlled/assisted reselection mode support communication to a network, the network controlled/assisted reselection mode support communication indicating whether the mobile wireless communication device is capable of performing reselection prediction;
    receiving a reselection control communication from the network in response to sending the network controlled/assisted reselection mode support communication to the network;
    reselecting using a default warning interval upon satisfying a reselection threshold in the absence of a packet broadcast control channel in a serving cell and in the absence of receipt of a new reselection threshold from the network.

8. A method in a mobile wireless communication device, the method comprising:
sending a network controlled/assisted reselection mode support communication to a network, the network controlled/assisted reselection mode support communication indicating whether the mobile wireless communication device is capable of performing reselection prediction;
receiving a reselection control communication from the network in response to sending the network controlled/assisted reselection mode support communication to the network;
disabling a reselection parameter on the mobile wireless communication device in response to receiving the reselection control communication,
wherein the reselection parameter is a C32 criterion parameter.

9. A method in a mobile wireless communication device, the method comprising:
sending a network controlled/assisted reselection mode support communication to a network, the network controlled/assisted reselection mode support communication indicating whether the mobile wireless communication device is capable of performing reselection prediction;
receiving a reselection control communication from the network in response to sending the network controlled/assisted reselection mode support communication to the network;
disabling a reselection parameter on the mobile wireless communication device in response to receiving the reselection control communication;
reselecting using a default warning interval upon satisfying a reselection threshold in the absence of a packet broadcast control channel in a serving cell and in the absence of receipt of a new reselection threshold from the network.

* * * * *